United States Patent [19]

Vogelesang et al.

[11] Patent Number: 4,836,084
[45] Date of Patent: Jun. 6, 1989

[54] ARMOUR PLATE COMPOSITE WITH CERAMIC IMPACT LAYER

[75] Inventors: Laurens B. Vogelesang, Nieuwkoop; Marcel L. C. E. Verbruggen, Arnhem; Cornelis G. Paalvast, Vlaardingen, all of Netherlands

[73] Assignee: Akzo nv, Arnhem, Netherlands

[21] Appl. No.: 16,728

[22] Filed: Feb. 20, 1987

[30] Foreign Application Priority Data

Feb. 22, 1986 [NL] Netherlands .......................... 8600449

[51] Int. Cl.$^4$ .............................................. F41H 5/04
[52] U.S. Cl. .................................... 89/36.02; 109/82; 428/911
[58] Field of Search .......................... 89/36.02, 36.08; 109/80, 82, 83, 84; 428/911; 2/2.2

[56] References Cited

U.S. PATENT DOCUMENTS

| | | | |
|---|---|---|---|
| 1,504,949 | 8/1924 | Gibbs | 89/36.08 |
| 2,279,110 | 4/1942 | Collins | 89/36.02 |
| 3,179,553 | 4/1965 | Franklin | 89/36.02 |
| 3,431,818 | 3/1969 | King | 89/36.02 |
| 3,516,898 | 6/1966 | Cook | 89/36.02 |
| 3,575,786 | 4/1971 | Baker et al. | 109/80 |
| 3,577,836 | 5/1971 | Tamura | 2/2.5 |
| 3,616,115 | 10/1971 | Klimmek | 109/84 |
| 3,977,294 | 8/1976 | Jahn | 89/36.02 |
| 4,131,053 | 12/1978 | Ferguson | 89/36.02 |
| 4,404,889 | 9/1983 | Miguel | 89/36.02 |
| 4,529,640 | 7/1985 | Brown et al. | 89/36.02 |
| 4,566,237 | 1/1986 | Turner | 109/82 |

FOREIGN PATENT DOCUMENTS

| | | | |
|---|---|---|---|
| 24713 | 3/1981 | European Pat. Off. | 89/36.02 |
| 0168746 | 1/1986 | European Pat. Off. | |
| 0169432 | 1/1986 | European Pat. Off. | |
| 1952759 | 4/1970 | Fed. Rep. of Germany | 89/36.02 |
| 7827301 | 9/1978 | Fed. Rep. of Germany | |
| 2943680 | 8/1982 | Fed. Rep. of Germany | |
| 864844 | 5/1941 | France | |
| 1102646 | 10/1955 | France | |
| 1144062 | 10/1957 | France | |
| 1146389 | 11/1957 | France | |
| 1566448 | 5/1969 | France | |
| 2447272 | 8/1980 | France | |
| 2469277 | 5/1981 | France | |
| 7803506 | 10/1979 | Netherlands | |
| 12957 | of 1915 | United Kingdom | 89/36.02 |
| 1142689 | 2/1969 | United Kingdom | |

OTHER PUBLICATIONS

Ballistic Materials etc., P. 142 by R. C. Laible.
European Search Report 87200268, 5/26/1987.
Rugger et al.–Ceramic Composite Armor, Kirk-Othmer Encyclopedia Chemial Technology, 1971.
Laible, Ceramic Composite Armor, Methods Phenonemon; Their Appl. Sci. Technol., vol. 5, 1980.
Mayseiess et al, Impact on Ceramic Targets, Journal of Applied Mechanics, vol. 54, Jun. 1987, pp. 373–378.

Primary Examiner—Stephen C. Bentley
Attorney, Agent, or Firm—Stevens, Davis, Miller & Mosher

[57] ABSTRACT

The preferred embodiment of the armor plate composite according to the invention is composed of four main components, viz. the ceramic impact layer, the sub-layer laminate, the supporting element and the backing layer. The ceramic impact layer is excellently suitable for blunting the tip of a projectile. The sub-layer laminate of metal sheets alternating with fabrics impregnated with a viscoelastic synthetic material is perfectly suitable to absorb the kinetic energy of the projectile by plastic deformation, sufficient allowance for said plastic deformation being provided by the supporting honeycomb shaped layer. The backing layer away from the impact side and consisting of a pack of impregnated fabrics still offers additional protection. The optimum combination of said four main components gives a high degree of protection of the resulting armour plate at a limited weight per unit of surface area.

15 Claims, 8 Drawing Sheets

ARMOUR PLATE COMPOSITE WITH CERAMIC IMPACT LAYER

The invention relates to an armor plate composite at least consisting of a hard impact layer based on ceramic material and an energy absorbing sub-layer attached to the impact layer and containing fiber layers impregnated with some material, preferably synthetic material.

An armor plate of the type indicated above is known from U.S. Pat. No. 3,516,898. Its claim 1 specifies an armor plate which on its impact side is provided with a hard ceramic layer of boron carbide or silicon carbide, backed by a plurality of layers of resin impregnated glass fabric. The ceramic layer may be composed of a number of adjacent tiles lying in the same plane. Or the ceramic layer may be provided on its impact side with a flexible layer, which may consist for instance of a resin impregnated glass fabric.

"Ballistic Materials and Penetration Mechanics" by Roy C. Laible, Elsevier Scientific Publishing Company 1980, p. 142, gives a description of the above armor plates with which the backup of the hard ceramic layer may consist of a single thick aluminum plate or two thinner aluminum plates having the same total thickness as the single thick plate or of a laminate of glass fibers. It is concluded that use of a backup consisting of a single relatively thick aluminum plate is to be preferred to employing two aluminum plates having the same overall thickness as the single plate. For, in the case of the two aluminum plates the ballistic limit was 100 m/s lower. Although the results obtained with said well-known armor plate composites may be reasonable, which will partly depend on the use envisaged for them, they are not considered optimal. For instance, an armor plate having a ceramic impact layer and a backup entirely consisting of glass fabric will generally require the use of an inadmissibly high number of fabric layers.

Reference is also made to DE 29 43 680, which describes an armor plate comprising an impact layer of ceramic material, such as aluminum oxide, boron carbide or other metal carbides, and a backup or sub-layer composed of 45 to 50 plies of aramid fiber fabrics impregnated with a synthetic material. DE-GM 78 27 301 describes an armored garment comprising an impact layer of a metal or ceramic plate and a backup layer made up of a great number of fabrics of aramid fibers. At the back is still an additional plate, which may be a thin sheet of steel or synthetic material, such as polycarbonate. The armoring materials according to DE 29 43 680 and DE-GM 78 27 301 are mainly of the same type as the armor plates described hereinbefore with reference to U.S. Pat. No. 3,516,898 and the book by R. C. Laible.

FR 2 447 272 describes an armor plate for a vehicle. The armor plate comprises a laminate of light weight metal sheets, for instance aluminum sheets, alternated by possibly reinforced sheets of synthetic material. This laminate is backed with a pack of fabrics of aramid fibers. A disadvantage to this well-known armor plate consists in that the plates of synthetic material will insufficiently cushion the impact of a projectile, particularly in that the synthetic sheets of thermoplastic material will no longer have adequate mechanical properties as a result of the local increase in temperature. Moreover, the impact side lacks a ceramic impact layer.

NL 7 803 506 describes an armor plate at the impact side of which there is provided a hard layer of steel or glass and a backup or sub-layer of elastic material, such as polyvinyl chloride, polycarbonate, nylon, synthetic resin bonded fabric, polypropylene or fibre. A backing of such composition is considered insufficiently capable of absorbing the kinetic energy of various projectiles.

U.S. Pat. No. 4,404,889 describes various embodiments of armor plates all of which both on their impact side and their inside are provided with a steel plate having a thickness of about 12.5 mm. Between these outer layers of steel plate there may be various other layers and plates, such as one or more layers of balsa wood, a layer of aramid fibers covered with steel foil, a honeycomb or an air cushion. Aparts from its complicated structure this well-known armor plate has the disadvantage of comprising a very heavy steel impact plate. Moreover, steel loses a great deal of its hardness and strength due to local heat development caused by heavy projectiles, as a result of which the tip of the pprojectile will not or insufficiently be blunted. The combination of high weight and a great many layers leads to a less efficient armor plate construction.

FR 1 102 646 describes an armor plate in the form of a laminate of three layers of fabric impregnated with a synthetic material and alternated by a thin film of synthetic material or a thin metal foil.

FR 864 844 describes an armor plate laminate made up of three steel plates alternated by layers of less hard material based on cellulose.

FR 1 566 448 describes an armor plate composed of a metal matrix containing overlapping tiles of a ceramic material.

FR 1 146 389 describes an armor plate of a laminate of thin metal sheets of steel or some aluminum alloy between which thicker sheets are provided which may be of some natural or synthetic rubber and in some cases may be reinforced with fabric.

FR 2 469 277 describes a protecting laminate of fabrics or inorganic or organic fibers, such as aromatic polyamides, which fabrics are bonded to a thermosetting or thermoplastic viscoelastic synthetic material having a loss factor tg $\delta$ of 0.5 to 1.5 and a modulus of elasticity of $10^6$ to $10^9 N/m^2$ at a frequency of 100 Hz and at service temperature.

FR 1 144 062 describes an armor plate laminate composed of a reinforced sheet of synthetic material, a steel sheet or fabrics.

U.S. Pat. No. 3,179,553 describes an armor plate of which the two outer layers and one middle layer are of beryllium. The three metal layers are alternated by a polycarbonate resin layer and an isocyanate rubber layer which may be reinforced with a glass fiber fabric. The layers may be bonded together with epoxy resin.

GB 1 142 689 describes an armor plate the impact side of which contains ceramic tiles, the upper and the under sides of which are covered with glass fiber fabrics, the backing of the armor plate consisting of a thick metal plate.

U.S. Pat. No. 3,577,836 describes protective clothing formed by a laminate of curved, overlapping plates of polytetrafluoroethylene covered with a nylon fabric, followed by a few layers of polyurethane foam separated by a layer of honeycomb units.

EP 0 168 746 describes an armor plate laminate comprising a metal or ceramic front layer bonded to a pack of fiber layers with a particular adhesive. The fiber layers are interconnected with a different glue which has a lower adhesive power than the former adhesive.

EP 0 169 432 describes a protective material which substantially consists of a laminate of fabrics composed of aramid fibers. The adhesive is mainly provided between the fabric layers, whereas the inside of the fabrics is substantially free from adhesive. Mention is made of various types of adhesive, such as polyvinyl, polycarbonate, polyamide, epoxy resin, polyurethane, etc.

U.S. Pat. No. 3,616,115 describes an armor plate formed by a laminate of titanium sheet followed by two layers of staggered ceramic blocks. The backing plate may consist of several fiber layers.

U.S. Pat. No. 4,131,053 describes an armor plate consisting of three layers of different materials bonded together by means of an adhesive. The first layer is of a hard face material, such as aluminum oxide, silicon carbide or the like. The second layer may be of beryllium or some other material having a high modulus but a lower hardness than the first layer. The third layer is of a synthetic material reinforced with high strength fiber.

Finally, U.S. Pat. No. 2,279,110 describes an armor plate composed of three steel plates which are bonded together by means of two adhesive layers.

Reference is also made to U.S. Pat. No. 4,529,640, which describes an armor plate composite comprising a thick steel impact plate backed successively by a preferably paper honeycomb plate and a pack of glass or aramid fabrics impregnated with a synthetic material.

Also to this well-known armor plate there is the drawback of the thick steel impact plate. Moreover, the thick steel plate will generally be deformed to a limited extent, so that the kinetic energy of the projectile is insufficiently absorbed.

The invention has for its object to provide an optimized armor plate composite of the type indicated above the opening paragraph which no longer shows the drawbacks to the well-known armor plates. The armor plate composite according to the invention is characterized in that the sub-layer is formed by a laminate of alternating fiber layers and metal sheets. This combination of alternating metal sheets and fiber layers as a sublayer backing the ceramic impact layer in the armor plate according to the invention leads to a surprisingly optimum uuse of the basically required properties of the metal sheets and the fiber layers. A particularly effective embodiment of the armor plate according to the invention is characterized in that the sub-layer laminate is attached to a joining, supporting element forming layer which on the side away from the impact side is attached to a backing layer formed by a laminate of fibers impregnated with, for instance, a synthetic material. On its impact side and on the side away from it the ceramic layer is with advantage provided according to the invention with a relatively thin antispall layer, such as a fiber layer in the form of a woven fabric or some other fabric impregnated with a synthetic material. It is preferred that the ceramic impact layer should have a total thickness of more than 3 mm. An armour plate offering better protection against a second bullet hit is characterized according to the invention in that the ceramic impact layer is composed of two, three or more interconnected superimposed and/or adjacent constituent plates of ceramic material, the superimposed constituent plates being attached to each other according to the invention by means of an interposed fiber layer in the form of a woven fabric or some other fabric which is preferably impregnated with synthetic material. According to the invention the interconnected superimposed and adjacent constituent plates of ceramic material are so positioned in the successive layers that the plates of each layer are staggered relative to those of the next layer, by which provision additional cushioning power is imparted to the ceramic layer. A simple embodiment is characterized according to the invention in that the ceramic impact layer is substantially composed of granules of one or more ceramic materials formed into a coherent mass, for instance by sintering.

Of the armour plate according to the invention the ceramic impact layer has a total thickness of 5 to 15 mm, more particularly about 10 mm, a hardness in the range of 1000 to 10,000 deca $N/mm^2$, preferably 1500 to 3000 deca $N/mm^2$, determined by the Vickers hardness measurement, and a ceramic material is substantially formed of one or more of the following materials: aluminum oxide, boron carbide silicon carbide or mixtures thereof.

An effective embodiment of the armor plate according to the invention is characterized in that the laminate forming the sublayer is composed of three or more, more particularly 5 to 20 and preferably about 10, metal plates alternated by one or more fiber layers, such as woven fabric or some other fabric. The metal plates are advantageously formed of steel or an aluminum alloy having a tensile strength higher than $300 N/mm^2$ and the metal plates each have a thickness of 0,1 to 2,0 mm, preferably about 0,3 to 0,9 mm. The metal plates may be of an aluminum-copper alloy, more particularly of the AA(USA) No 2024-$T_3$ type, or an aluminum-zinc alloy, more particularly of the AA(USA) No. 7075-$T_6$ type, or an aluminum-magnesium-silicon alloy, more particularly of the AA(USA) No. 6061-$T_6$ type. According to the invention the fiber layer(s) between the successive metal plates (has) have a total thickness of 0.3 to 5 mm.

A preferred embodiment of the armor plate according to the invention is characterized in that the fiber in the sub-layer laminate have a total thickness of 5 to 20 mm, preferably about 10 mm, a modulus of elasticity in the range of $1 \times 10^5$ up to $25 \times 10^4$ $N/mm^2$, preferably $8 \times 10^4$ up to $15 \times 10^4$ $N/mm^2$, and the fibers in the sub-layer laminate are in the form of substantially polyparaphenylene terephthalamide filament yarns, for instance of the dtex 1680/f 1000 type. According to the invention the fiber in the sub-layer laminate are in the form of a woven fabric having a weave of the type suitable for ballistic purposes, such as a plain weave or panama weave. A favorable embodiment of the armor plate according to the invention is characterized in that the fiber layers in the backing laminate are attached to the metal plates and impregnated with a viscoelastic substance of which the tangent of the loss angle $\delta$ measured at 20° C. and a frequency of 1 Hertz, has the values $0,01 < \text{tangent } \delta < 100$, more particularly $0,3 < \text{tangent } \delta < 2$ and the loss-shear modulus $G''$, also measured at 20° C. and a frequency of 1 Hertz has the values $10^2 \text{ Pa} < G'' < 10^9 \text{ Pa}$, more particularly $10^4 \text{ Pa} < G'' < 10^6 \text{ Pa}$.

Favorable results may be obtained with an armor plate which according to the invention is characterized in that the viscoelastic substance with which the fiber layers in the sub-layer laminate are impregnated is a synthetic material based on alkyl(meth)acrylate or a synthetic material based on a copolymer of 80 of 95 parts by weight of an alkyl acrylate having an alkyl group containing 6 to 10 carbon atoms and 20 to 5 parts by weight of at least one monomer from the group of acrylic acid, methacrylic acid, acrylonitrile, methacrylonitrile, acrylamide and methacrylamide. According to the invention it is preferred that the viscoelastic substance should be a synthetic material of 20 to 25% by weight of 2-ethylhexyl acrylate, 65 to 70% by weight of isooctyl acrylate and 5 to 15% by weight of acrylic acid. According to the invention it is also possible in principle that for the impregnation of the fiber layers in the mixed laminate use is made of viscoelastic substances based on polyurethane or polyvinyl chloride. According to the invention the viscoelastic substance may contain a plasticizer, for instance in an amount of not more than 50% by weight. According to the invention the viscoelastic substance with which the fiber layers in the mixed laminate are impregnated also may with advantage be formed of substantially or partly amorphous polymers or copolymers, such as natural or synthetic rubber, or polyvinyl alcohol, polypropylene, glycol diisocyanate copolymers and like materials.

The armor plate according to the invention is advantageously characterized in that the supporting element forming layer has a total thickness of 5 to 50 mm, preferably 10 to 30 mm, and is formed by a plate of an aluminum alloy having an open structure, such as a honeycomb structure, the open structure being covered on either side with a, for instance aluminum alloy plate having a small thickness relative to that of the supporting element. Favorable results can in principle also be obtained if according to the invention the supporting element forming layer is composed of a formed plastic or a mat with an open structure and made up of synthetic fibers said mat being of the type for instance commercially available as Enkamat ®. When the armor plate according to the invention is hit by a heavy projectile, said supporting element forming layer acts in a unique way as a crumple zone, which allows of the deformation of the sub-layer and as a result of which the kinetic energy of the projectile can be absorbed to a considerable extent. The supporting element, which may be in the form of a honeycomb, further offers the advantage that it can be easily attached in that it can be bonded to the object to the protected, for instance by gluing.

A preferred embodiment of the armor plate is characterized according to the invention in that the back layer is formed by a laminate of, say, 3-20 inter-bonded fabric layers impregnated with a synthetic material and of a fabric weave of the type usually employed for ballistic purposes, such as a plain weave or a panama weave, the fabrics being composed of poly-paraphenyleneterephthalamide filament yarns.

Particularly favorable results are expected of an armor plate composite which is characterized according to the invention in that the impact layer of ceramic material, such as aluminum oxide, is built up of one or more superimposed and/or adjacent constituent plates;

the impact layer has a total thickness of 5 to 15 mm;

the impact layer has a hardness in the range of 1000 to 10,000 daN/mm$^2$, preferably 1500 to 3000 daN/mm$^2$, determined by the Vickers hardness measurement;

the ceramic plate(s) is (are) coated on either side with an antispall layer having a total thickness of 0.1 to 2 mm, such as a woven fabric impregnated with a synthetic glue based on energy resin and having a weave of the type commonly employed for ballistic purposes and composed of yarns, more particularly filament yarns, having a modulus of elasticity of $1 \times 10^4$ to $25 \times 10^4$ N/mm$^2$, such as poly-paraphenylene terephthalamide (PPDT), polyethylene (PE), glass, polyacrylonitrile (PAN), polyvinyl alcohol (PVA) or like material;

the laminate forming the back layer is composed of 5 to 15 plates of metal, such as an aluminum alloy having a tensile strength of at least 300N/mm$^2$, alternating with a woven fabric impregnated with a viscoelastic substance and having a weave of the type commonly and having a weave of the type commonly employed for ballistic purposes, such as a plain weave or a panama weave, and composed of yarns, more particularly filament yarns, having a modulus of elasticity of $1 \times 10^4$ to $25 \times 10^4$ N/mm, such as PPDT, PE, glass, PAN PVA or like material;

the sub-layer laminate has a total thickness of 5 to 25 mm and each of the metal plates has a thickness of 0.2 to 1 mm;

the sub-layer laminate is attached to a joining, supporting element forming layer, such as an aluminum alloy plate having a honeycomb structure, a plate of foam plastic or a mat having an open structure and composed of synthetic fibers;

the supporting element has a total thickness of 5 to 30 mm;

the supporting element is attached to a back layer of a laminate of 3-20 impregnated woven fabrics of a weave of the type commonly employed for ballistic purposes, such as a plain weave or a panama weave, and composed of yarns, more particularly filament yarns, having a modulus of elasticity in the range of $1 \times 10^4$ to $25 \times 10^4$ N/mm$^2$, such as PPDT, PE, glass, PAN, PVA or like material;

that the backing layer has a total thickness in the range of 2 to 20 mm.

An effective embodiment of the armor plate according to the invention is characterized in that the mass of the composite is in all 35 to 350 kg/m$^2$, more particularly approximately 55 kg/m$^2$ for protection against small fire-arms.

The preferred embodiment of the armor plate composite according to the invention is made up of four main components, viz. the ceramic impact layer, the sub-layer laminate, the supporting element and the backing layer. The ceramic impact layer is excellently suitable for blunting the tip of a projectile, particularly because the ceramic materials applied will retain their hardness and strength despite the high increase in temperature that will occur in the region struck by a projectile. The sublayer laminate is perfectly suitable to absorb the kinetic energy of the projectile by plastic deformation, sufficient allowance for said plastic deformation being provided by the supporting layer. The backing layer of the armor plate composite according to the invention away from the impact side still offers additional protection and will remain practically undamaged even upon the impact layer being struck with fairly heavy ammunition, such as 7.62 mm A-P munition (hard core). As the armor plate composite according to the invention contains an optimum combination of said main components, the resulting armor plate offers a high degree of protection with a limited weight per unit of surface area. The armor plate composite is therefore particularly suitable for various uses. As fields of application for the armor plate composite may be mentioned the armor of combat vehicles, war vessels, fighter aircraft and combat helicopters. However, the armor plate composite according to the invention is also very suitable for use in tthe civilian area for instance for the additional protection of paassenger cars, money transport vans and for other purposes requiring special safety precautions.

Although the armor plate composite according to the invention is of an essentially simple construction, it is, interalia, the special composition of the sub-layer laminate of metal plates alternating with fabrics impregnated with the proper viscoelastic substance which contributes to particularly effective protection of the present armor plate against various projectiles or flying fragments. On the basis of what is stated on page 142 of Roy C. Laible's book mentioned hereinbefore the use of a single thicker aluminum plate would be expected to be more favorable than the use of two aluminum plates of the same overall thickness. Surprisingly, according to the invention, it appears that the use for an armor plate of said sub-layer laminate composed of several metal plates, more particularly of an aluminum alloy, with between every two of these plates a fabric layer impregnated with a viscoelastic synthetic material, is particularly effective.

The invention will be further described with reference to the accompanying schematic drawings.

FIGS. 5 and 6 illustrate the armor plates according to

Figure 1:
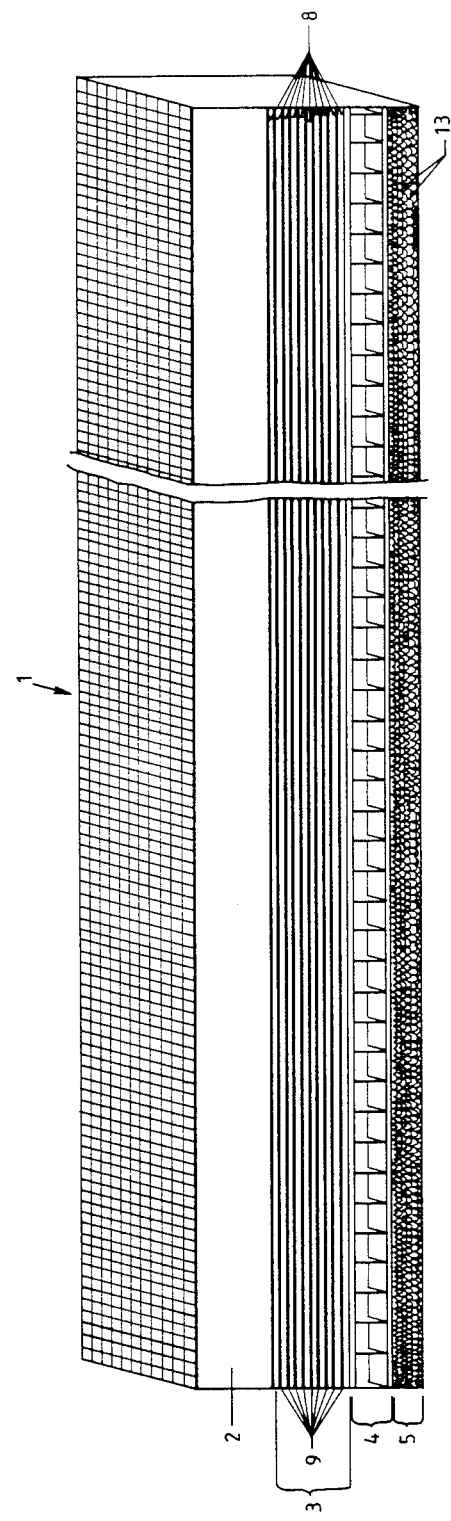
FIG. 1 is a view in cross-section and in side elevation of an armor plate according to the invention.
Figure 3:
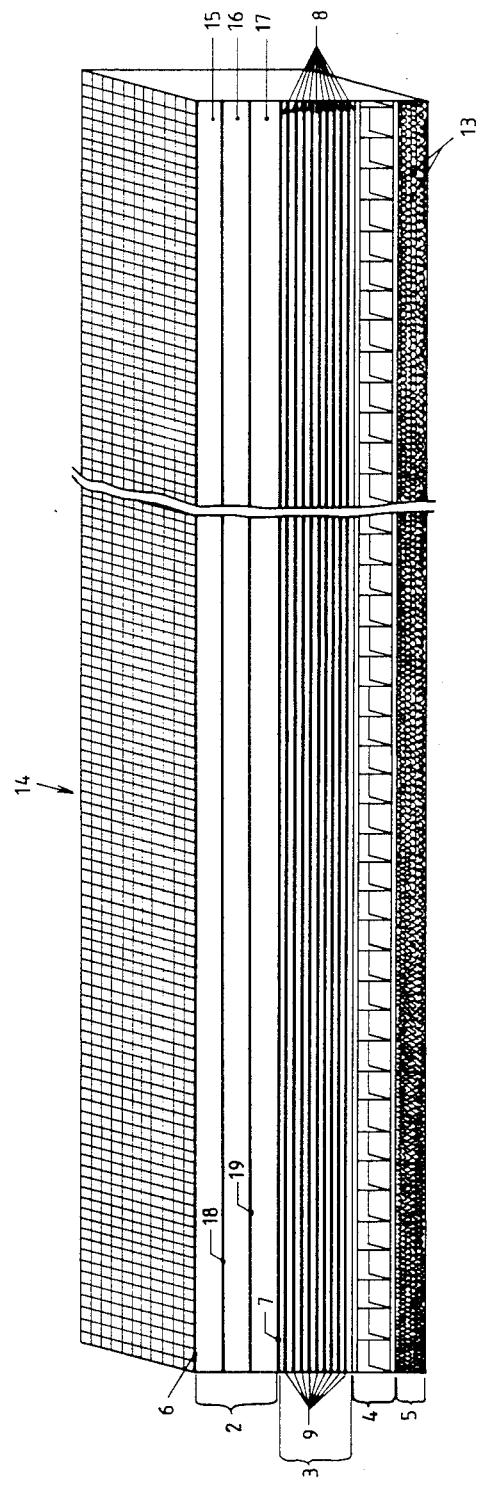
FIG. 3 is a view in cross-section and side elevation of a somewhat modified embodiment.

FIGS. 1 and 3, respectively, after they were hit by a projectile.

In FIG. 1 the numeral 1 generally indicates an armor plate composite. The plate 1 as shown in the drawing comprises four main components, viz. a ceramic impact layer 2, a sub-layer 3, a supporting layer 4 and a back layer 5. The impact layer 2 substantially consists of sintered fine powder of aluminum oxide ($Al_2O_3$) having a total thickness of, say, about 10 mm. The impact layer 2 is coated on either side with antispall layers 6, 7 which consist of a plain weave fabric of glass yarns or aramid yarns impregnated with a synthetic material. The synthetic material, which may be a glue based on epoxy resin, must be such that it can be used for properly bonding the antispall layers 6, 7 to the ceramic impact layer 2 at elevated temperature and pressure. For the synthetic material use may be made, for instance, of the AF 163-2 type glue marketed by Minnesota Mining and Manufacturing Company.

The sub-layer 3 comrises ten plates 8 of an aluminum-copper alloy of the AA(USA) NO. 2024-$T_3$ type, each plate having a thickness of 0.5 mm. Between every two successive metal plates 8 is a fabric layer 9, so that the ten metal plates 8 of the sublayer 3 are alternated by in all nine fabric layers 9, which are each indicated by a bold line.

The fabrics 9 are impregnated with a synthetic material having viscoelastic properties. The viscoelastic synthetic material contains about 22.5% by weight of ethylhexyl acrylate, about 67.5% by weight of isooctyl acrylate and about 10% by weight of acrylic acid, which material is marketed by Minnesota Mining and Manufacturing Company under the trade name Scotch Damp ® 15D112. On a sample of the viscoelastic synthetic material used the tangent of the loss angle δ was found to be about 0,8 at a temperature of 20° C. and a frequency of 1 Herz. Further, on the sample of the viscoelastic synthetic substance a value of about $10^5$ for the loss-shear modulus G″ was measured at a temperature of 20° C. and a frequency of 1 Herz. Both the warp and the weft yarns of the fabrics 9 are filament yarns of poly-paraphenylene terephthalamide (PPDT). The PPDT yarns used are marketed by Enka under the trade name Twaron ® 1000. These yarns have a tensile strength of about 2750 MPa, a modulus of elasticity of about 80 GPa and an elongation at rupture of about 3.3%. Particularly, use may be made of the following two types of fabrics:

| Type 1 | Warp | Weft |
| --- | --- | --- |
| Linear density (Tex) | 126 | 126 |
| Density (threads/cm) | 11.8 | 11.8 |
| Weave | plain 1/1 | |
| Twist (t/m) | 60 | 0 |
| Weight (g/cm$^2$) | 271–288 | |

| Type 2 | | |
| --- | --- | --- |
| Linear density (Tex) | 168 | 168 |
| Density (threads/cm) | 13.4 | 13.0 |
| Weave | panama 2/2 | |
| Twist (t/m) | 60 | 0 |
| Weight (g/cm$^2$) | 458–492 | |

The sub-layer 3 may be made in a separate process of making a plurality of fabric layers 9 alternating with metal plates 8. Each aramid fabric has a thickness of, say, about 0.15 mm and is covered on either side with a thin film of the viscoelastic synthetic material. The resulting laminate is formed into one sub-layer 3 under the influence of heat and pressure. The sub-layer 3 in the armor plate first of all serves to absorb the kinetic energy of a projectile by plastic deformation of the metal plates of the sub-layer laminate 3, by delamination, by the viscoelastic behavior of the synthetic material with which the fabrics 9 are impregnated and the breaking energy of the yarn. During such deformation the shearing forces between the fabric layers 9 and the metal plates 8 must not become unduly great. To that end use must be made of said synthetic material with viscoelastic properties for the purpose of impregnating the fabrics 9 and attaching said fabrics to the metal plates 8. The use of synthetic material with viscoelastic properties results in such a bond between the fabric layers 9 and the metal plates 8 as will impart sufficient coherence to the sub-layer 3 to absorb the desired degree of kinetic energy due to plastic deformation, but will not give as strong a bond as obtained by a good generally thermoseting type of glue.

The supporting plate 4 shown in the drawing of the armor plate 1 consists of an open honeycomb structure 10 of an aluminum alloy. The honeycomb structure 10 is covered on either side with thin metal plates 11, 12 which are bonded to it by gluing and each have a thickness of, say, 0.5 mm and consist of an aluminum alloy. The overall thickness of the honeycomb structure 10 and the covering plates 11, 12 is for instance about 10 mm. Optionally, a layer of hard expanded synthetic material or a mat of synthetic threads and an open structure may be used instead of the honeycomb structure.

The back layer 5 is formed of a pack of fifteen interbonded fabrics 13 of PPDT filament yarns contained in a matrix of synthetic material. The fabrics 13 may be formed in the same way and impregnated with the same viscoelastic synthetic material as the fabrics 9 in the sub-layer 3. The total thickness of the back layer 5 may be, for instance, 6 mm.

Said four main constituents of the armor plate composite 1, i.e. the ceramic impact layer 2, the sub-layer 3, the supporting layer 4 and the back layer 5 may after being separately manufactured be formed into one unit by bonding them together at some external pressure.

Figure 2:
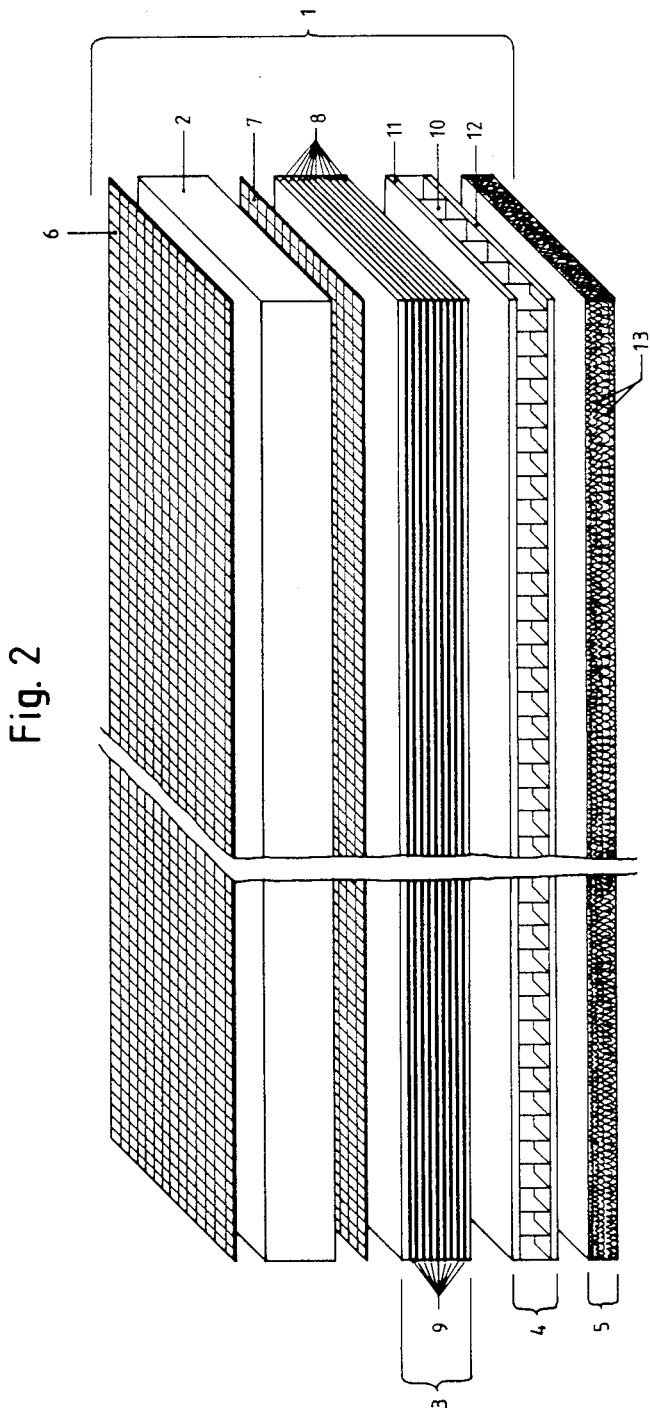
FIG. 2 is a somewhat exloded view of the construction according to FIG. 1.

FIG. 3 shows an armor plate composite 14 which only differs from the armor plate 1 of FIGS. 1 and 2 as far as the construction of the ceramic impact layer 2 is concerned, corresponding parts being referred to by like numerals. In the armor plate 14 the ceramic impact layer 2 is composed of three superimposed constituent layers 15, 16 and 17. At their contact surfaces these constituent layers are bonded together by a glued joint via fabrics 18 and 19 of glass or PPDT yarns that are impregnated with a synthetic glue. With the exception of the impregnating agent the fabrics 18 and 19 and the fabrics 6 and 7 may be formed in the same way as the fabric layers 9 in the sub-layer 3.

Figure 4:
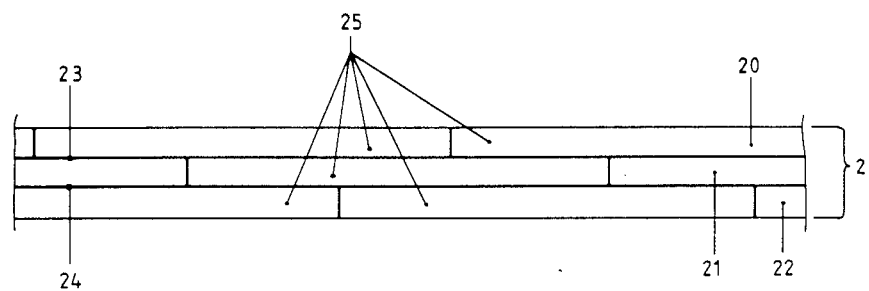
FIG. 4 shows a modified embodiment of the ceramic layer.

FIG. 4 shows a variant construction of the ceramic impact layer 2. The impact layer 2 again consists of three interattached constituent layers 20, 21 and 22, which constituent layers again alternate with fabrics 23 and 24 impregnated with a synthetic glue. In contrast with the construction according to FIG. 3 each of the constituent layers 20, 21, 22 in the construction according to FIG. 4 is built up of adjacent tiles 25, the tiles in each constituent layer being staggered relative to those in the next constituent layer.

Figure 5:
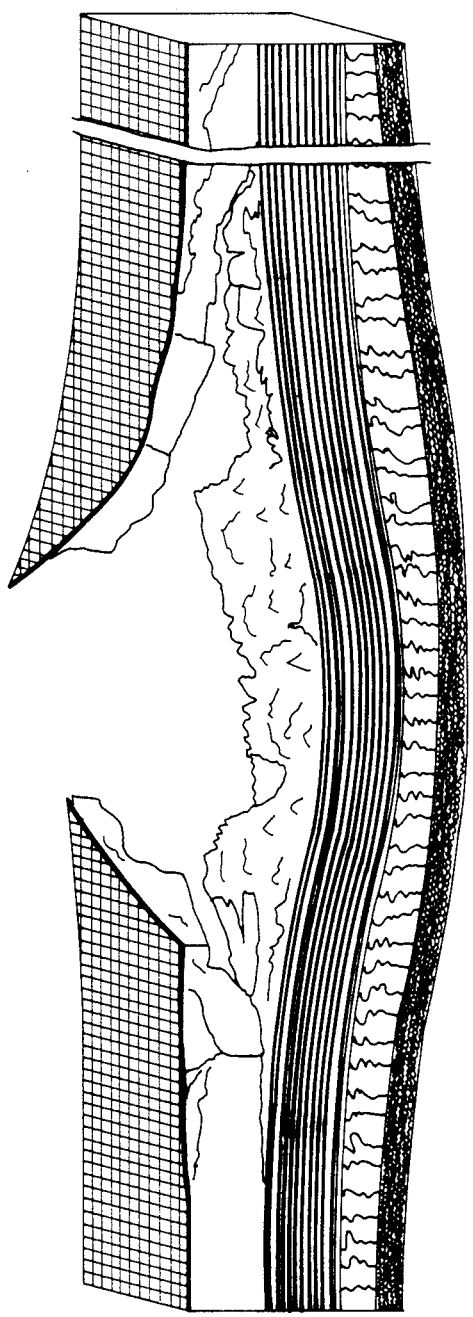
Figure 6:
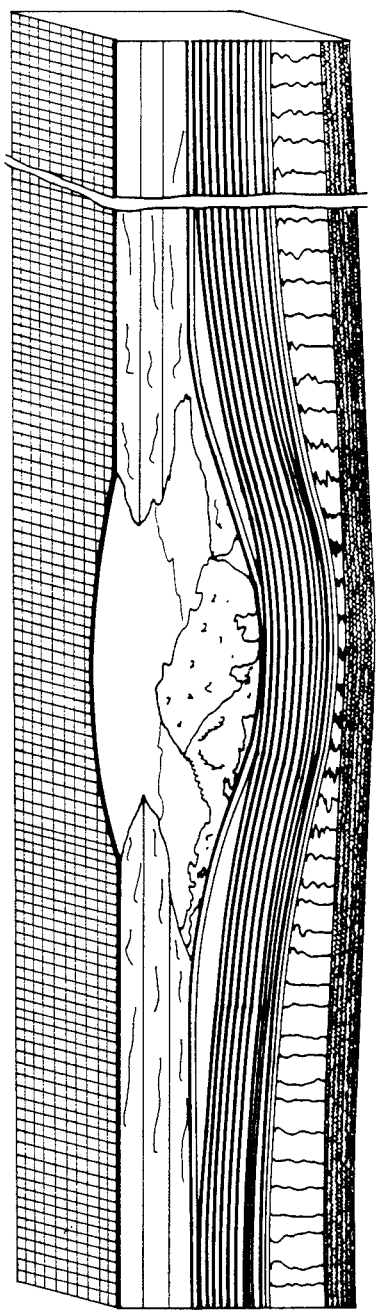

The armor plate composite according to the invention was tested ballistically against an FAL (Fusil Automatique Légère) and 7.62 mm AP-ammunition (hard core), with the armour plate according to the invention being at a distance of 25 mm from the firearm. FIGS. 5 and 6 are two full-scale drawings of the armor plates of FIG. 1 and FIG. 3, respectively, after one shot had been fired at them in the above tests. Although the two armor plates appear to be damaged by the projectile, they were not penetrated by it. The hard ceramic impact layer 2, which first of all serves to blunt the tip of the projectile was for the greater part destroyed in either case (FIGS. 5 and 6), as was to be expected because of the function of the ceramic impact layer. In both plates the sub-layer laminate 3 of alternating fabric layers and aluminum plates has clearly been subjected to plastic deformation but has suffered only little damage and does not show any penetration at all, which must be considered a particularly favorable result in ballistic tests with said type of ammunition. The drawings also clearly demonstrate that the sub-layer laminate 3 fulfills its function of mainly absorbing the kinetic energy of the projectile. The supporting layer 4 in the form of an aluminum honeycomb structure acts as crumple zone and allows of sufficient room for the plastic deformation of the sub-layer laminate 3. Underneath the area of impact of the projectile the back layer 5 is only slightly buckled and not damaged at all.

Figure 7:
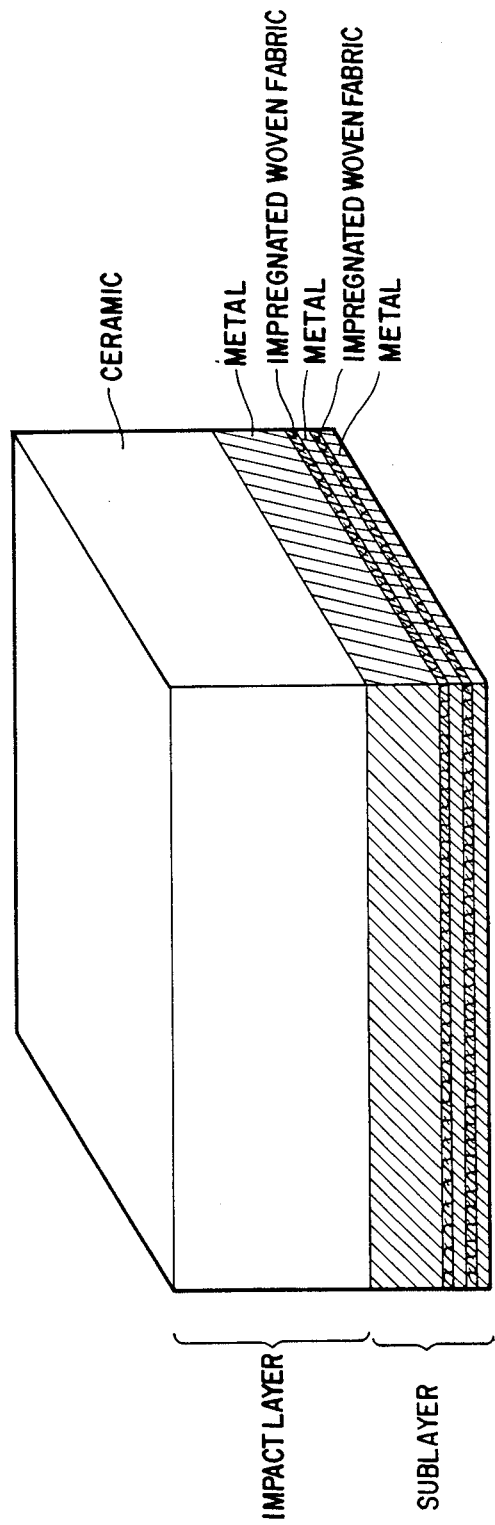
FIGS. 7 and 8 illustrate embodiments of the invention showing its essential elements of an impact layer and a sub-layer.
Figure 8:
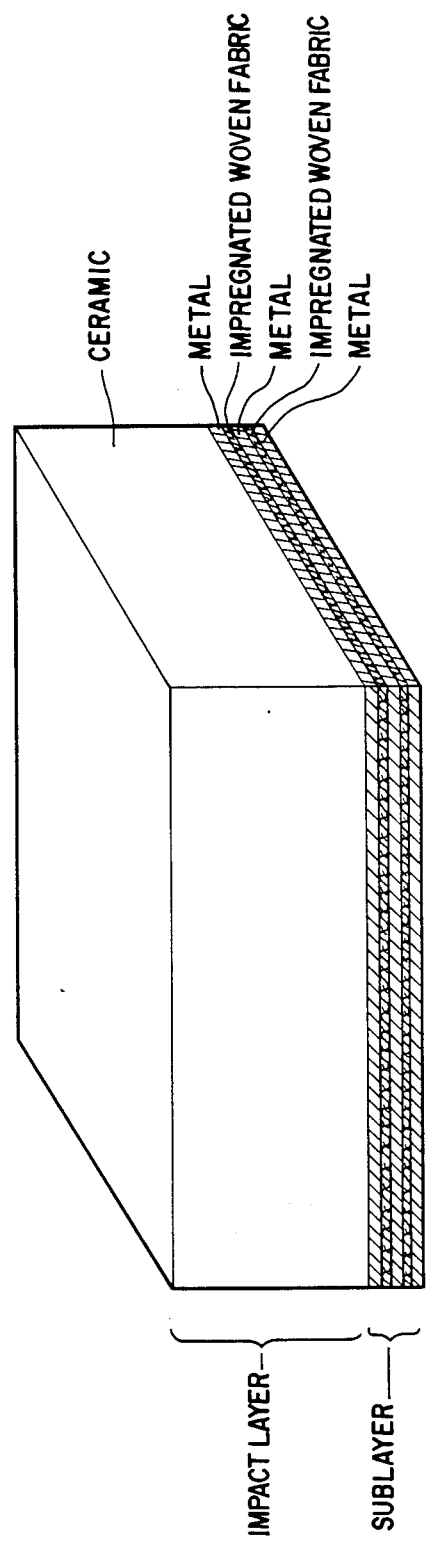

Comparison of the FIGS. 5 and 6 shows that the division of the ceramic impact layer 2 into three superimposed interattached constituent layers 15, 16 and 17 constitutes a considerable improvement. For, the hole produced in the ceramic impact layer 2 is far smaller in the armor plate shown in FIG. 6. The armour plate 14 of the type according to FIG. 3 (FIG. 6) will offer better protection when the armor plate is hit in places at short distances from each other (multi-hit) by several projectiles. The back layer 5 of the armor plate 14 of FIG. 3 is even less deformed that in the case of the plate 1 of FIG. 1, as appears upon comparison of FIGS. 5 and 6. From FIG. 6 it appears that the honeycomb layer plays a more effective role. FIGS. 7 and 8 illustrate the invention in its essential form of an armor plate composite comprising a specified impact layer and a specified sub-layer laminate. The difference between the embodiments shown in FIGS. 7 and 8 resides in the fact that in the FIG. 7 embodiment the upper metal plate of the sub-layer laminate has a greater thickness than the remaining two metal plates. This feature is also shown in sub-layer laminate 3 of the FIG. 2 embodiment. In the embodiment according to FIG. 8 all of the metal plates of the sub-layer laminate have the same thickness. The afore-mentioned mechanical properties of the fiber such as tensile strength, modulus or elasticity and elongation at rupture were measured in accordance with ASTM-D-885.

It should be added that by said loss-shear modulus G" is to be understood the out of phase part of the complex dynamic shear modulus G* in the plane of the viscoelastic layer. The complex dynamic shear modulus G* is the quotient of the amplitude $\tau_0$ of the sinusoidal shear stress $\tau$ and the amplitude $\gamma_0$ of the applied sinusoidal shear $\gamma$:

$$G^* = \tau_0/\gamma_0$$

The loss modulus G" is then:

$$G'' = G^* . \sin \delta$$

where $\delta$ is the phase angle between shear stress $\tau$ and shear $\gamma$. Said shear modulus G" and loss angle $\delta$ are measured in a dynamic rheometer, in which the viscoelastic material consisting of one or several layers is between two parallel round plates with a radius R. From the amplitude $\theta_0$ of the angle of torque $\theta(\theta = \theta_0 \sin 2\pi f.t)$ sinusoidal in the time t of the one plate relative to the other plate and the amplitudie $M_0$ of the also sinusoidal, but phase shifted, torque $M(M = M_0 \sin (2\pi f.t + \delta))$ the complex modulus G* can be calculated as follows:

$$G^* = \frac{2 \cdot h}{\pi \cdot R^4} \cdot \frac{M_0}{\theta_0}$$

where h is the thickness of the viscoelastic layers between the plates. f is the frequency of the sinusoidal vibration in Hertz. Slippage between the layers and between the plates and the viscoelastic material must be avoided.

The aromatic polyamides to be used according to the invention are polyamides which are entirely or substantially built up of repeating units of the general formula

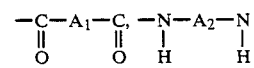

and/or $$-\underset{\underset{O}{\|}}{C}-A_3-\underset{\underset{H}{|}}{N}-$$

where $A_1$, $A_2$ and $A_3$ represent different or the same divalent, one or more aromatic rings-containing rigid radicals which may contain a heterocyclic ring, of which radicals the chain-extending bonds are in a position para to each other or are parallel and oppositely directed.

Examples of such radicals are 1,4-phenylene, 4,4'-biphenylene, 1,5-naphthalene and 2,6-naphthylene. They may or may not carry substituents, such as halogen atoms or alkyl groups. In addition to amide groups and the above-mentioned aromatic radicals the chain molecules of the aromatic polyamides may optionally contain up to 50 mole% of other groups, such as m-phenylene groups, non-rigid groups, such as alkyl groups, or ether, urea or ester groups, such as 3,4'-diaminodiphenyl ether groups. According to the invention it is preferred that the yarn should entirely or substantially consist of poly-p-phenylene terephthalamide (PPDT). The manufacture of PPDT is described in U.S. Pat. No. 4,320,081.

Although favorable results may be obtained with the armor plate composites shown in the drawings, the invention is not limited thereto. Within the scope of the invention various modifications can still be made. For instance, the layer thickness and the number of plates may be varied with the use envisaged. In the sub-layer laminate 3 the fabric layers 9 impregnated with synthetic material will generally have a smaller thickness than the metal plates 8. Although the metal plates 8 will generally all be of the same thickness, this is not absolutely necessary. Although the fabrics applied are preferably of PPDT filament yarns, it is also possible in principle to use other filament yarns of the desired high modulus and tensile strength, such as yarns of glass or yarns of polyethylene (PE), polyvinyl alcohol (PVA) or polycrylonitrile (PAN) obtained by solvent spinning or ballistic types of nylon and polyester. The manufacture of PE filaments by solvent spinning may be carried out as described in, for instance, GB 2 042 414, GB 2 051 667 or EP 64 167. The manufacture of PVA filaments by solvent spinning may be carried out as described in, for instance, U.S. Pat. No. 4,440,711. The manufacture of PAN filaments by solvent spinning may be effected as described in, for instance, EP 144 983 or JP Patent Application No. 70449/83. Although said fiber layers, such as fabrics, are preferably made up of filament yarns, it may under some circumstances also be possible to use spun yarns. It should be noted that various visco-elastic materials, more particularly synthetic materials, having favorable damping properties are described in U.S. Pat. No. 4,034,639 and U.S. Pat. No. 3,799,025.

We claim:

1. An armor plate composite comprising:
   a hard impact layer based on ceramic material; and
   an energy absorbing sub-layer attached to the impact layer and containing fiber layers impregnated with a bonding material;
   the sub-layer being formed by a laminate of alternating fiber layers and metal plates;
   said laminate comprising at least three metal plates;
   at least one fiber layer being attached to and interposed between each pair of subsequent metal plates;
   each metal plate being formed of an aluminum alloy;
   said ceramic impact layer having a total thickness of more than 3 mm;
   said fiber layers in the sub-layer laminate being in the form of a woven fabric;
   the fibers in said fiber layers in the sub-layer laminate having a modulus of elasticity in the range of $1 \times 10^4$ up to $25 \times 10^4 N/mm^2$; and
   said ceramic impact layer having a thickness which is greater than the thickness of each of said metal plates.

2. An armor plate according to claim 1, wherein said ceramic impact layer has a hardness in the range of 1000 to 10,000 da $N/mm^2$ determined by the Vickers hardness measurement.

3. An armor plate according to claim 1, wherein said ceramic impact layer is substantially formed from aluminum oxide.

4. An armor plate according to claim 1, wherein said ceramic impart layer has a total thickness of 5 to 15 mm.

5. An armor plate according to claim 1, wherein the impact side of the ceramic impact layer is coated with a relatively thin antispall layer in the form of a woven fabric.

6. An armor plate according to claim 1, wherein said sub-layer laminate has a total thickness of 5 to 20 mm.

7. An armor plate according to claim 1, wherein the metal plates in said sub-layer each have a thickness of 0.1 to 2.0 mm.

8. An armor plate according to claim 1, wherein said sub-layer comprises 5 to 20 metal plates.

9. An armor plate acording to claim 1, wherein the fibers in said fiber layers in the sub-layer laminate have a modulus of elasticity in the range of $8 \times 10^4$ up to $15 \times 10^4 N/mm^2$.

10. An armor plate according to claim 1, wherein the fibers in said fiber layers in the sub-layer laminate are of a material selected from the group of poly-paraphenylene terephthalamide, glass, polyethylene, polyvinyl alcohol or polyacrylonitril.

11. An armor plate according to claim 1, wherein the fibers in said fiber layers in the sub-layer laminate are in the form of filament yarns.

12. An armor plate according to claim 1, wherein the fiber layers in the sub-layer laminate are impregnated with a bonding material formed by a visco-elastic substance of which the tangent of the loss angle δ, measured at 20° C. and a frequency of 1 Hertz, has the values $0.01 < \text{tangent } \delta < 100$ and the loss-shear modulus $G''$, also measured at 20° C. and a freuency of 1 Hertz, has the values $10^2 Pa < G'' < 10^9 Pa$.

13. An armor plate according to claim 12, wherein the fiber layers in said sub-layer laminate are impregnated with a visco-elastic substance of which the tangent of the loss angle δ, measured at 20° C. and a frequency of 1 Hertz, has the values $0.3 < \text{tangent } \delta < 2$ and the loss-shear modulus $G''$, also measured at 20° C. and a frequency of 1 Hertz, has the values $10^4 Pa < G'' < 10^{-6} Pa$.

14. An armor plate according to claim 1, wherein the sub-layer laminate is attached to a joining supporting element layer in the form of a honeycomb structure consisting of an aluminum alloy.

15. An armor plate according to claim 14, comprising a back layer attached to the side of the supporting element layer opposite to the side thereof attached to the sub-layer laminate, said back layer being formed by a laminate of interbonded impregnated layers of woven fabrics.

* * * * *